United States Patent [19]

Gilmore

[11] 4,394,022
[45] Jul. 19, 1983

[54] MECHANICALLY EXPANDABLE ANNULAR SEAL

[76] Inventor: Richard F. Gilmore, Kennewick, Wash., granted to U.S. Department of Energy under the provisions of 42 U.S.C. 2182

[21] Appl. No.: 306,998

[22] Filed: Sep. 29, 1981

[51] Int. Cl.³ .................. F16K 27/04; F16J 15/16; F16L 37/20
[52] U.S. Cl. .................................... 277/36; 277/101; 277/126
[58] Field of Search .................. 277/9, 35, 36, 101, 277/126, 128

[56] References Cited

U.S. PATENT DOCUMENTS

| | | | |
|---|---|---|---|
| 2,243,255 | 5/1941 | McDonald | 277/36 |
| 2,848,257 | 8/1958 | Moore | 277/126 |
| 2,926,012 | 2/1960 | Maher . | |
| 3,264,004 | 8/1966 | Sciaky | 277/126 |
| 3,715,134 | 2/1973 | Faccov | 277/36 |
| 3,915,462 | 10/1975 | Bruns et al. . | |
| 3,994,472 | 11/1976 | Williams | 277/128 |
| 4,124,361 | 11/1978 | Revell | 277/101 |
| 4,138,126 | 2/1979 | Javdt | 277/191 |

Primary Examiner—Robert I. Smith
Attorney, Agent, or Firm—Richard E. Constant; Edward W. Nypaver; Richard G. Besha

[57] ABSTRACT

A mechanically expandable annular reusable seal assembly to form an annular hermetic barrier between two stationary, parallel, and planar containment surfaces. A rotatable ring, attached to the first surface, has ring wedges resembling the saw-tooth array of a hole saw. Matching seal wedges are slidably attached to the ring wedges and have their motion restricted to be perpendicular to the second surface. Each seal wedge has a face parallel to the second surface. An annular elastomer seal has a central annular region attached to the seal wedges' parallel faces and has its inner and outer circumferences attached to the first surface. A rotation of the ring extends the elastomer seal's central region perpendicularly towards the second surface to create the fluidtight barrier. A counterrotation removes the barrier.

10 Claims, 6 Drawing Figures

MECHANICALLY EXPANDABLE ANNULAR SEAL

The U.S. Government has rights in this invention pursuant to Contract No. DE-AC-14-76-FF02170 between the U.S. Department of Energy and the Westinghouse Hanford Company.

BACKGROUND OF THE INVENTION

The present invention relates generally to hermetic sealing systems and more particularly to a fluidtight seal assembly which is mechanically actuated, expandable, annular, and reusable.

In numerous industries, such as nuclear, manufacturing, and aerospace, certain operations and products require use of an annular expandable hermetic seal between two stationary and flat containment surfaces. Usually the annular seal surrounds an orifice or opening in one or both of the containment surfaces. A simple example would be the use of an expandable annular seal between the sealing flanges of two stationary pipe sections. A more sophisticated example would be the use of an expandable annular seal between the surfaces surrounding the access port valves of a nuclear reactor and a nuclear fuel assembly transfer machine.

Existing annular expandable seals have been only inflatable seals which can be visualized as resembling a bicycle tire innertube which is pumped up with air to achieve a hermetic barrier between two containment surfaces and around any possible opening in each containment surface.

Inflatable seals historically have been used as pressure containment boundaries in a variety of industrial, military, and most recently, nuclear applications. The pneumatic seal concept was initially used to provide seals for aircraft canopies, submersible tank turrets, and airlock doors. They were later incorporated into more critical components such as shield plugs and valves where the seal requirements increased from that of maintaining a pressure controlled environment to that of preventing the loss of minute amounts of radioactive gases.

Inflatable (gas actuated) seals in current use have problems in the areas of cross-seal leakage, range of containment pressure, actuation/deactuation control, service life, and sustained fail-safe operation. Inflatable seals are limited to low inflation pressures, and hence can only contain low pressures between the containment surfaces. The loss of inflation gas from inflatable seals typically is on the order of one to five psi per day. This severely limits the duration a seal can maintain a seal barrier in the event of a failure in the gas or electrical supply system. Increased inflation pressures will increase inflation gas leak rates. Inflatable seals are deactuated by venting the inflation gas to the atmosphere, or in the case of radioactive gas to a gas processing system. There is no indication, or assurance, that the translating portion of the seal has not stuck to the closure sealing surface. The actuation/deactuation of the inflatable seal depends on the reliability of electrical or pneumatic systems to operate or maintain. Also, there has not been a practical method developed yet for detecting defects at the internal surfaces once the inflatable seal has been molded into its inner-tube shape.

SUMMARY OF THE INVENTION

It is an object of the invention to provide a mechanically actuated, expandable, annular seal assembly.

It is another object of the invention to provide a reusable seal assembly.

It is an added object of the invention to provide a seal assembly which retains a hermetic barrier against high containment pressures.

It is also an object of the invention to provide a seal assembly having, and indicating, positive seal retraction.

It is a further object of the invention to provide a seal assembly which has a sustained fail-safe sealed operation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the expandable annular seal assembly may comprise a stiff round ring and a mechanism for attaching the ring parallel to a flat, unmoving first containment surface while allowing the ring to move only in rotation about its longitudinal axis. The seal assembly also has ring wedges secured to the ring. Each ring wedge has an identically slanted square-thread helical-shaped surface pointed obliquely away from the ring and pointed obliquely towards a flat, unmoving, second containment surface. The two containment surfaces are close together, but not touching, and are parallel. Each ring wedge also has the shape of a ring segment, and the ring wedges are uniformly arranged together in a ring-like array, coaxial with the ring, resembling the sawtoothed pattern of a hole saw. The seal assembly additionally has seal wedges. Each seal wedge touches the slanted surface of its paired ring wedge and has a first face pointed towards and parallel with the second containment surface. Each seal wedge also has the shape of a ring section, and the ring wedges are arranged together in a generally touching, ring-like cluster with the ring wedge's first faces all lined in a single plane. A device is provided for connecting each seal wedge to its paired ring wedge while allowing the seal wedge to slide along the ring wedge's slanted surface. An appliance is provided for limiting the movement of the seal wedges to a motion which is perpendicular to the first containment surface. The seal assembly further has an elastomer seal, generally shaped like the ring, placed between the seal wedges' first faces and the second containment surface. The inner and outer circumferences of the elastomer seal are connected to the first containment surface with a fluidtight bond while a central ring region of the elastomer seal is connected to the seal wedges' first faces. A mechanical apparatus is provided for rotating and counterrotating the ring between two angular positions, and maintaining the ring at either angular position. The rotation of the ring will, through the interlocking movement of the ring wedges and seal wedges, extend the elastomer seal to create an annular hermetic barrier between the two containment surfaces. The hermetic barrier will be removed by retracting the elastomer seal by counterrotating the ring.

Several benefits and advantages are derived from the invention. The invention's mechanical extension and retraction type of expandable annular reusable seal assembly can contain high pressures between the containment surfaces, and maintain a fail-safe sealed condition without relying on gas supply or electrical actuation systems. The invention provides for positive elastomer seal retraction which is verifiable by the position of a mechanical rotation apparatus.

BRIEF DESCRIPTION OF THE DRAWINGS

The accompanying drawings which are incorporated in and form a part of this specification, illustrate an embodiment of the present invention and, together with a description, serve to explain the principles of the invention. In the drawing.

DETAILED DESCRIPTION OF THE INVENTION

Reference will now be made in detail to the present preferred embodiment of the invention, an example of which is illustrated in the accompanying drawings.

Figure 1:
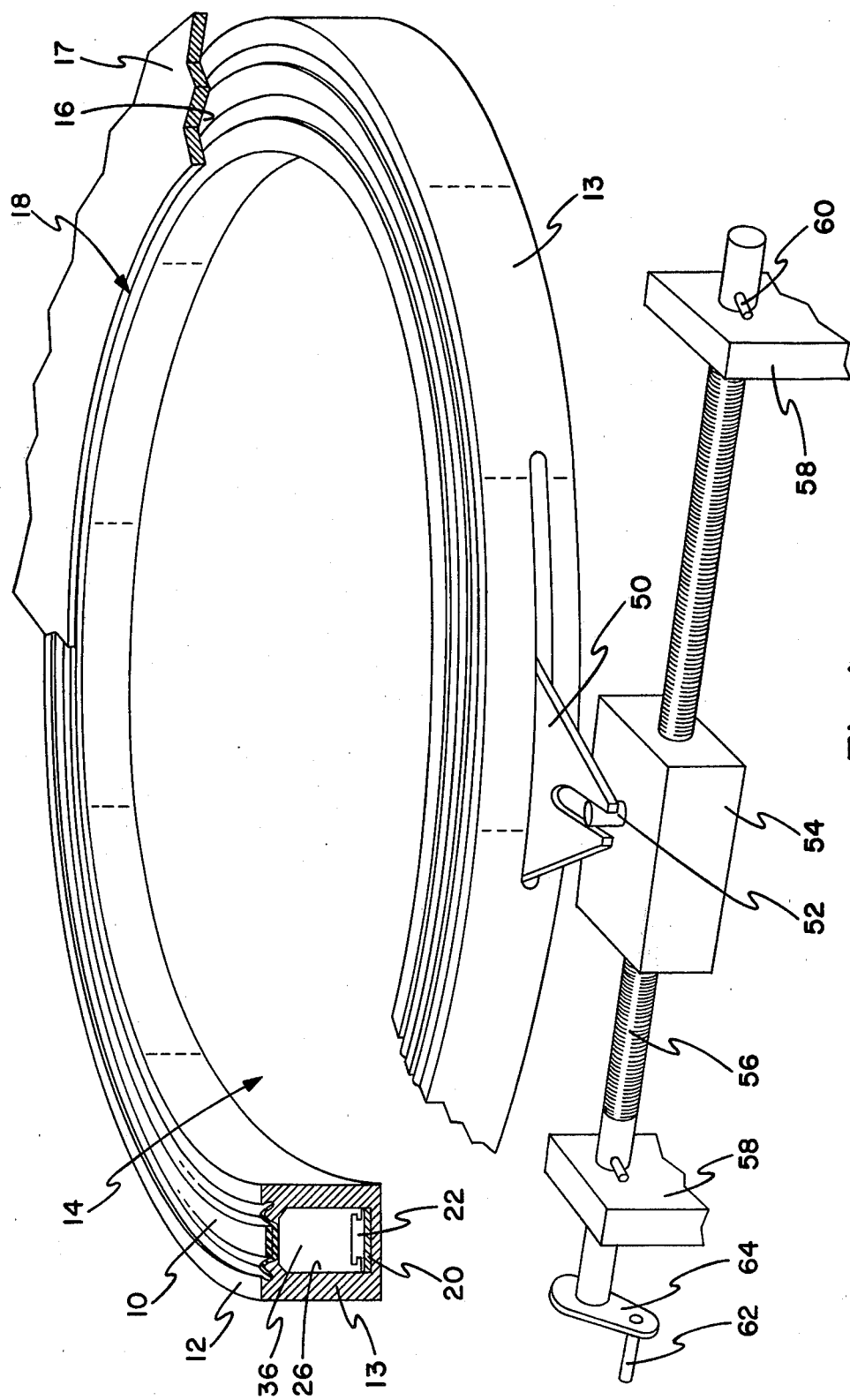
FIG. 1 is a partial cutaway view of the mechanical expandable annular seal assembly.
Figure 2:
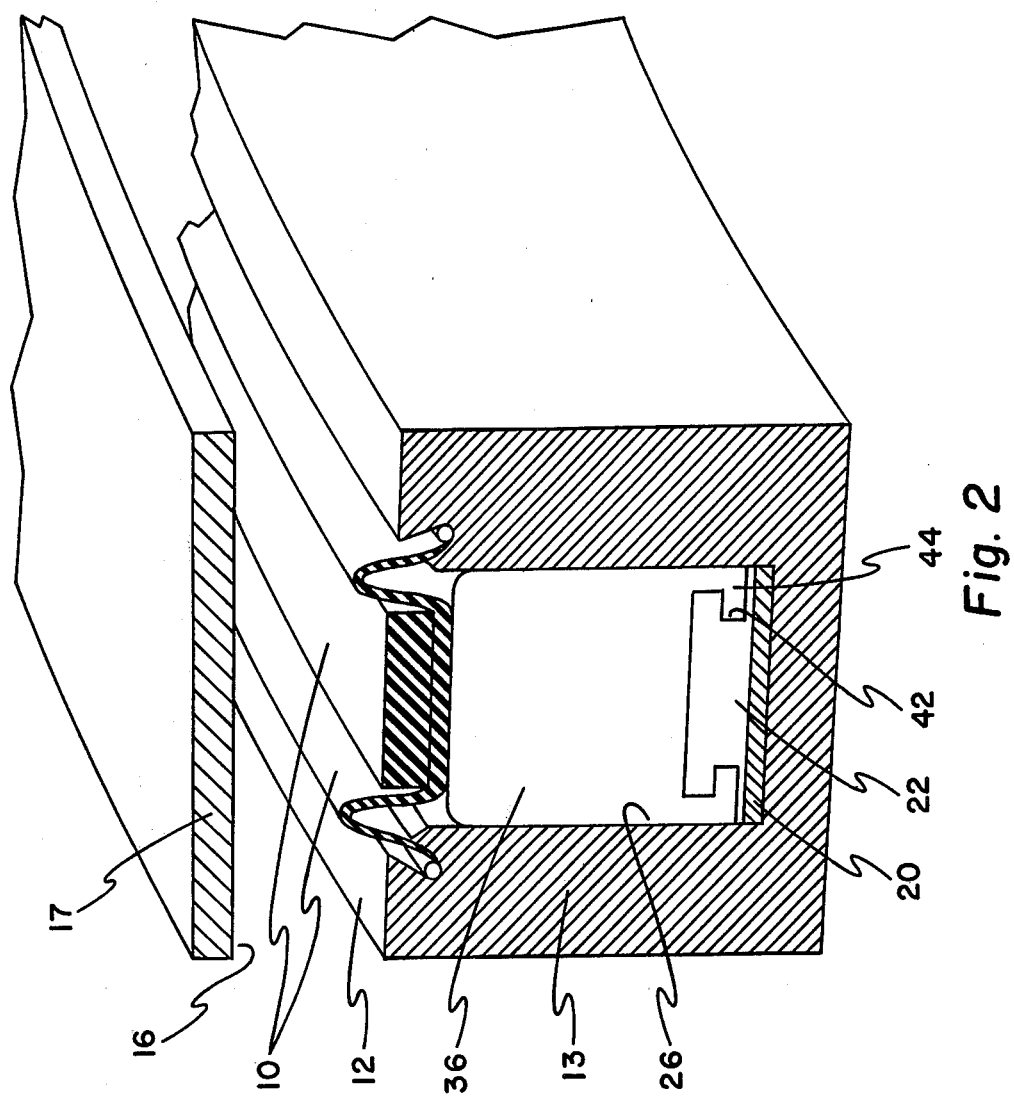
FIG. 2 is an enlarged partial cutaway view of a segment of FIG. 1 showing the elastomer seal in the retraction position.
Figure 3:
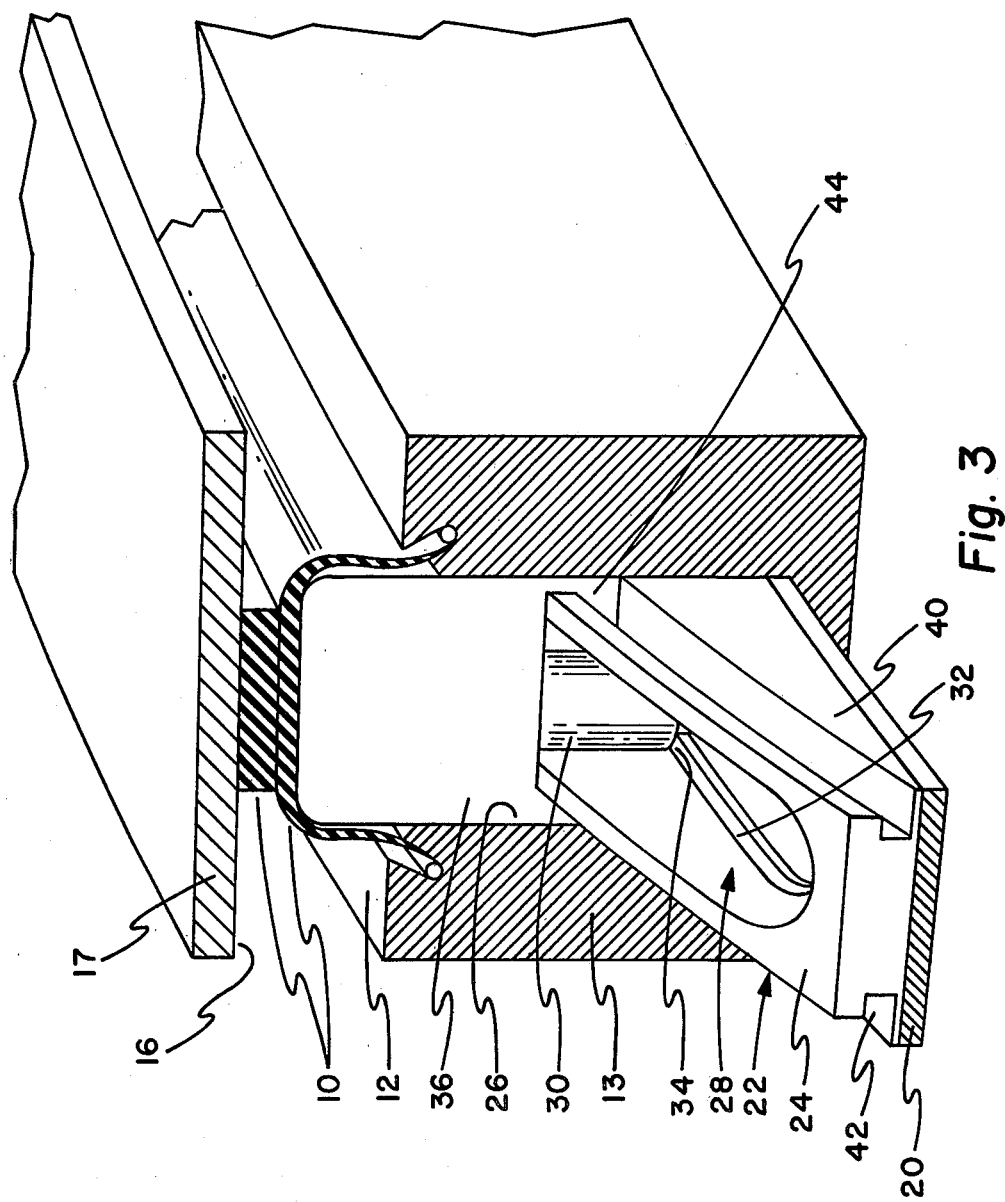
FIG. 3 is identical with FIG. 1, but shows the elastomer seal in the extended position.
Figure 4:
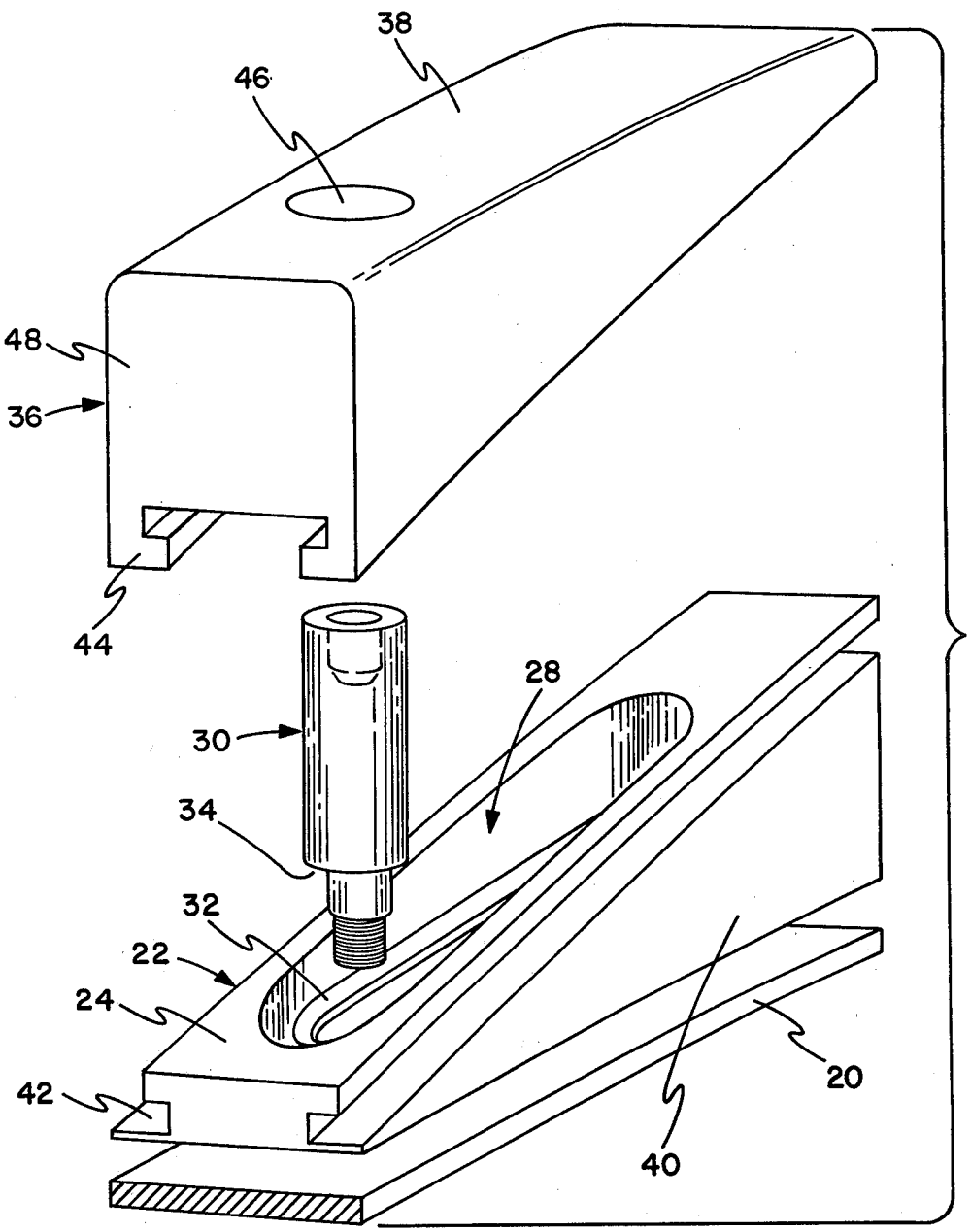
FIG. 4 is an exploded view of a ring wedge-seal wedge-fixed post subassembly.
Figure 5:
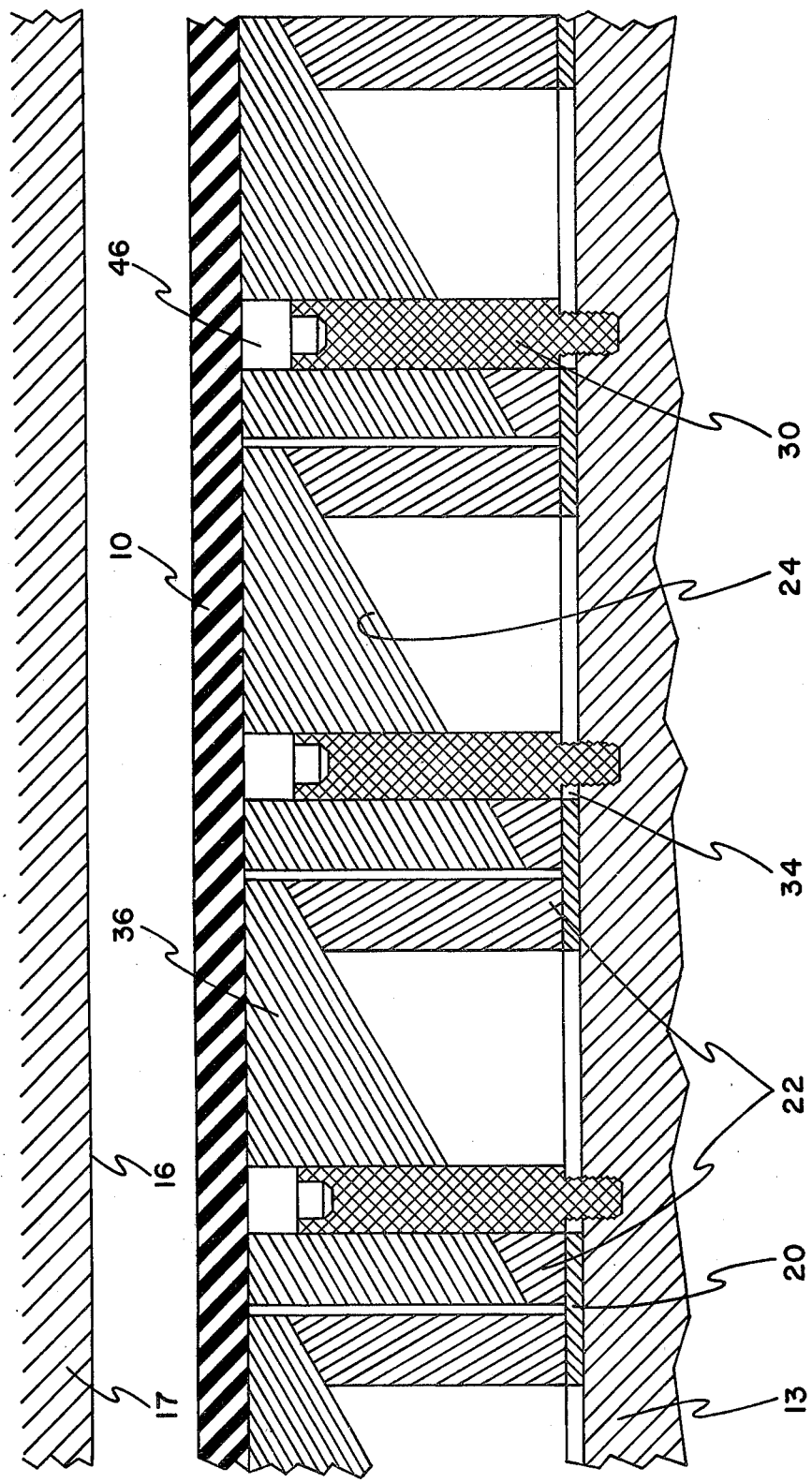
FIG. 5 is a cross sectional side view of FIG. 2.
Figure 6:
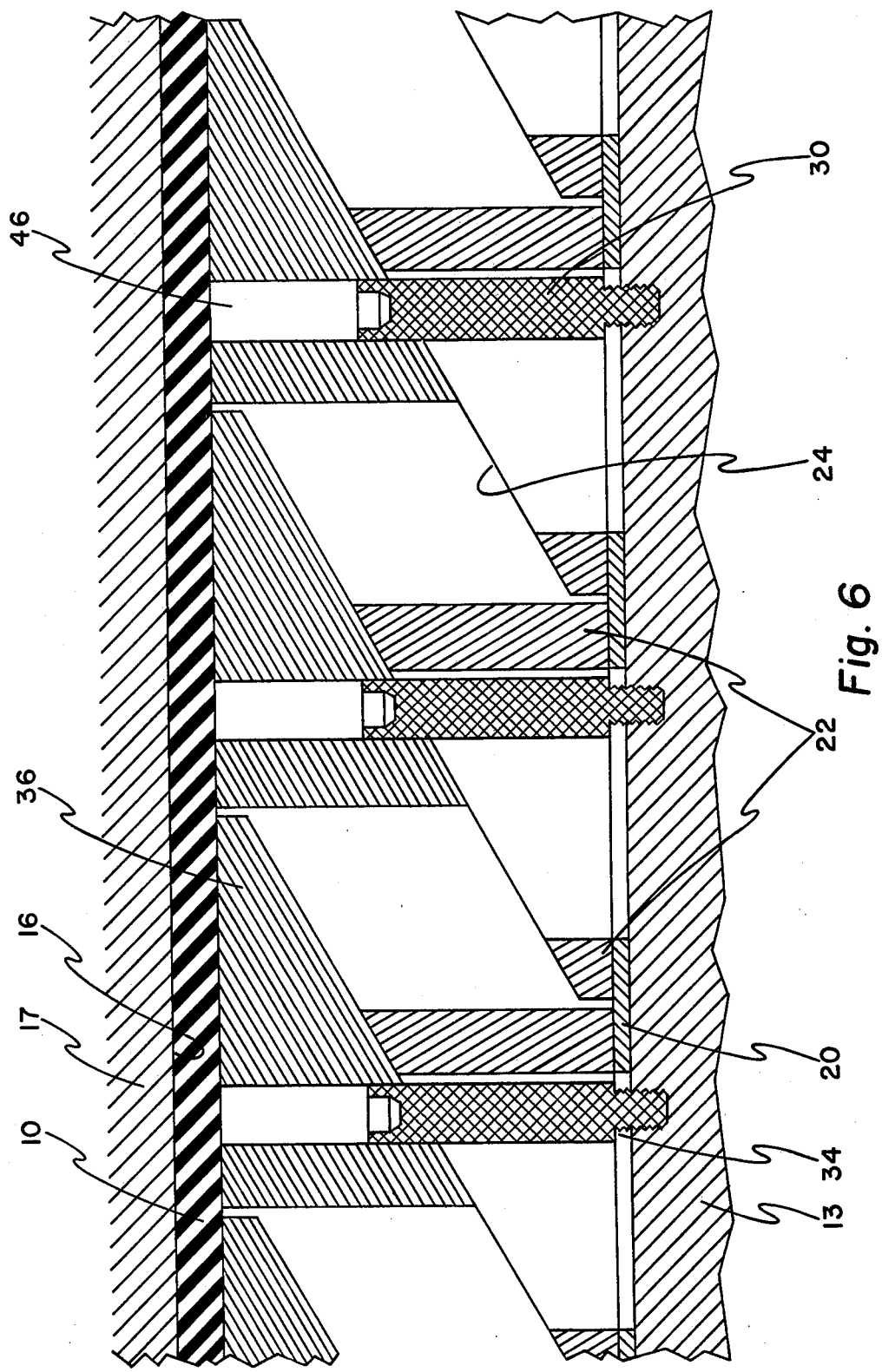
FIG. 6 is identical to FIG. 5, but shows the elastomer seal in its extended position.

The mechanically expandable annular seal assembly is depicted in FIG. 1. Those parts not fully shown in FIG. 1 are revealed in FIGS. 2 through 6. Referring to the figures, an annular elastomer seal 10 has its inner circumference and outer circumference hermetically attached to a first containment surface 12 which is a surface of a first structure 13. The attachment may be accomplished with the use of a suitable glue and/or mechanical fastener (such as a holddown wire secured to a channel in the first containment surface). The first containment surface 12 is generally planar and stationary, and would usually contain an opening 14 which is surrounded by the elastomer seal 10. The first containment surface 12, as an example, could be a surrounding surface of a first structure 13 which is (or which can be fastened to) an access port valve of a nuclear reactor. The elastomer seal 10 may be of a single or multilayer construction and have a thickened central annular region which can form a hermetic seal, when the elastomer seal 10 is extended, with a second containment surface 16 which is a surface of a second structure 17. The second containment surface 16 is generally planar and stationary, and would usually contain an orifice 18 which is surrounded by the elastomer seal 10, when extended. The second containment surface 16 is proximate, spaced apart, and generally parallel to the first containment surface 12 and, as an example, could be a surrounding surface of a second structure 17 which is (or which can be fastened to) the access port valve of a nuclear fuel assembly transfer machine. The elastomer seal 10 may be unstretched in its extended position and hence may have circumferential folds in its retracted position.

The remaining components of the reusable seal assembly invention provide for the repeated mechanical extension of the annular elastomer seal 10 to form a hermetic barrier between the two containment surfaces 12 and 16, and provide for the repeated mechanical retraction of the annular elastomer seal 10 to remove that barrier.

The seal assembly includes a rigid circular ring 20 and a plurality of ring wedges 22 fixed to the ring 20. Each ring wedge 22 has an inclined surface 24 pointing obliquely away from the ring 20. The inclined surface 24 of each ring wedge 22 is generally identically inclined and has the shape of part of a helix, specifically the shape of part of a square thread on a square-threaded fastener. Preferably each ring wedge 22 is identical with each other. Each ring wedge 22 has the shape of a segment of an annulus. The ring wedges 22 are together similarly positioned on the ring 20 to form an annular array, coaxial with the ring 20, which resembles the saw-tooth array of a hole saw. Preferably the ring wedges 22 are generally contiguous meaning they are touching each other, or very nearly so. The ring 20 and ring wedges 22 could even be constructed as a single unit.

Means are provided for movably attaching the ring 20 generally parallel to the first containment surface 12 while generally limiting the ring's motion to a rotation about the ring's longitudinal axis. With this parallel attachment, the inclined surface 24 of each ring wedge 22 could point generally (obliquely) towards the second containment surface 16. Preferably the ring attachment means includes an annular groove 26 in the first containment surface 12, a slot 28 in each of the ring wedges 22, and a fixed post 30 placed in each slot 28 and fastened to the first containment surface 12. The annular groove 26 generally matches the shape of the ring 20 and the ring 20 is placed in the groove 26. The slot 28 has the shape of a segment of an annulus placed coaxially with the ring 20. The slot 28 runs from the inclined surface 24 of the ring wedge 22 through the ring wedge and through the ring 20 and ends in a narrowing ledge portion 32 at the first containment surface 12. The fixed post 30 has a shoulder portion 34 which is wider than the ledge portion 32 of the slot 28. The shoulder portion 34 engages the ledge portion 32 to hold the ring 20 generally parallel with respect to the first containment surface 12 while permitting a limited rotation of the ring 20 about its longitudinal axis. It is preferred that the fixed posts 30 be identical and be equally spaced in an annular array. Other ring attachment means includes the ring 20 having a radially outwardly projecting, coaxially disposed, annular rim which engages a matching channel in the first containment surface 12, or the ring 20 and the first containment surface 12 having their engaging surfaces joined by an annular tongue and groove attachment similar to that which could hold a monorail train to its track, or the like.

The seal assembly also includes a plurality of seal wedges 36. There is one seal wedge 36 for each ring wedge 22, and each seal wedge 36 contacts the inclined planar surface 24 of its corresponding ring wedge 22. Each seal wedge 36 has a first face 38 which is a planar surface oriented generally parallel with, and pointed towards, the second containment surface 16. Preferably each seal wedge 36 is identical with each other. Each seal wedge 36 has the shape of a section of an annulus. The seal wedges 36 are together positioned to form an annular cluster or array with the first faces 38 of the seal wedges 36 together generally lying in a single plane. The seal wedges 36 are generally contiguous meaning they are nearly touching each other. Some play between the seal wedges 36 is desirable, and in some applications may be necessary, to allow the proper movement of the seal wedges 36 which will be discussed later in this application.

Means are provided for slidably attaching each of the seal wedges 36 to its corresponding ring wedge 22 in such a manner that the seal wedge 36 can slide along the inclined planar surface 24 of the ring wedge 22. Preferably the seal wedge slidable attachment means includes a seal wedge rim and ring wedge groove attachment system. Each ring wedge 22 has two opposing, concentric, generally similar-shaped sides 40. Each concentric side 40 would have a groove or channel 42 which is near the ring wedge's inclined surface 24 and matches its square-thread helical shape. Each seal wedge 36 would have two inwardly-terminating ribs 44. Each seal wedge rib 44 would be slidably matable with a corresponding ring wedge channel 42. Other seal wedge slidable attachment means would include the ring wedge's inclined planar surface 24 having an inverted "T"-shaped groove on each side of the slot 28 and the corresponding seal wedge having matching inverted "T"-shaped rims or the like.

Means are also provided for restricting the movement of the seal wedges 36 to be perpendicular to the first containment surface 16. Preferably the seal wedge perpendicular movement means includes each seal wedge 36 having a bore 46 which is oriented perpendicular to the first containment surface 12 and which is located near the thick end 48 of the seal wedge 36. Such means also includes the fixed post 30 being elongated and generally matching the seal wedge's bore 46 so that the fixed post 30 will loosely penetrate the bore 46 to limit the movement of the seal wedge 36 to a sliding motion along the fixed post 30. Thus a rotation of the ring 20 causes the ring wedges 22 to rotate which causes the seal wedges 36 to slide with respect to the ring wedges 22 and along the fixed post 30 in a motion which is perpendicular to the first containment surface 16. Other seal wedge perpendicular movement means includes the seal wedge's concentric sides having pins engaging perpendicular slots in the first containment surfaces annular groove, and the like.

The elastomer seal 10 is positioned between the seal wedge's first faces 38 and the second containment surface 16. A central annular portion of the elastomer seal 10 is attached (by mechanical fasteners and/or chemical bonding) to the first faces 38 of the seal wedges 36. Thus a rotation of the ring 20 will extend the elastomer seal covered seal wedges 36 in a perpendicular direction towards the second containment surface 16 where the elastomer seal 10 will contact the second containment surface 16 by the extending seal wedge's first faces 38 which are parallel to the second containment surface 16. A counterrotation of the ring will positively retract the elastomer seal 10 from the second containment surface 16.

Finally, the invention includes mechanical means for rotating and counterrotating the ring 20 between a first angular position and a second angular position, and for maintaining or holding the ring 20 at either angular position. Preferably such ring rotation means includes the ring 20 having a radially outwardly extending clevis yoke 50 which surrounds a clevis pin 52 attached to a screw slide block 54 which acts as a nut to a lead screw drive 56 which acts as a matching bolt. The lead screw drive 56 and the screw slide block 54 are threadably engageable. The lead screw drive 56 is nonradially disposed and is preferably disposed generally perpendicular to the clevis yoke 50, so that rotating the lead screw drive 56 will translate the clevis pin 52 of the screw slide block 54 to rotate the clevis yoke 50 and hence to rotate the ring 20. The lead screw drive 56 is limited to a rotation by supports 58 abutting holding pins 60, and the rotation is accomplished by turning a crank handle 62 of a crank 64 which is attached to an end of the lead screw drive 56. Other mechanical ring rotation means includes a ring wedge 22 having a clevis yoke instead of the ring 20, or by replacing the clevis yoke/screw slide block and pin with spiral bevel gears on hour glass worm gears on the ring and the lead screw drive, or the like.

A ring centering method could also be used to help reduce friction when the ring 20 is rotated. This could include ball bearings or spring loaded centering balls or the like placed between the ring 20 and the first containment surface's annular groove 26 contacting surfaces.

The operation of the mechanically expandable annular seal assembly is as follows. To create a hermetic barrier between the two containment surfaces 12 and 16, the crank handle 62 is manually used to turn the crank 64 which rotates the lead screw drive 56. The rotation of the lead screw drive 56 translates the screw slide block 54 and its clevis pin 52. The linear motion of the clevis pin 52 causes a rotation of the clevis yoke 50 and attached ring 20 about the ring's longitudinal axis. The rotation of the ring 20 causes the attached ring wedges 22 to rotate which causes the seal wedges 36 to slide forth to extend the elastomer seal 10 towards the second containment surface 16 to form a fluidtight barrier. To remove the fluidtight barrier, the crank handle 62 is manually used to counterrotate the lead screw drive 56 which counterrotates the ring 20 and ring wedges 22 to slide back the seal wedges 36 to retract the elastomer seal 10 from the second containment surface 16.

In summary, a mechanically expandable annular seal assembly may be created between two parallel, stationary, planar containment surfaces by attaching an annular elastomer seal's inner and outer circumference to the first containment surface and then mechanically extending the central annular portion of the elastomer seal towards the second containment surface using an underlying annular mechanism utilizing a rotatable ring with annular segment shaped ring wedges having slidably attached, and perpendicular moving only, annular section shaped seal wedges which are attached to a central portion of the elastomer seal.

The foregoing description of a preferred embodiment of the invention has been presented for purposes of illustration and description. It is not intended to be exhaustive or to limit the invention in the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended the scope of the invention be defined by the claims appended hereto.

What I claim is:

1. An expandable annular reusable seal assembly for hermetically sealing a first generally planar stationary containment surface to a second generally planar stationary containment surface wherein said second containment surface is proximate, spaced apart, and generally parallel with respect to said first containment surface, said seal assembly comprising;
  (a) a rigid, circular ring having a longitudinal axis;
  (b) means for movably and generally parallelly attaching said ring to said first containment surface so that said ring's motion is generally restricted to a rotation about its longitudinal axis;
  (c) a plurality of ring wedges fixed to said ring, each of said ring wedges having a generally identically inclined square-thread helical-shaped surface oriented obliquely away from said ring and obliquely towards said second containment surface, said ring wedges each also having the shape of an annular segment and together similarly disposed in an annular, generally hole-saw-tooth-like array coaxial with said ring;
  (d) a plurality of seal wedges, each of said seal wedges contacting said inclined surface of a corresponding said ring wedge and having a first face generally lying a plane disposed towards, and generally parallel with, said second containment surface, said seal wedges each also having the shape of an annular section and together disposed in a generally contiguous annular cluster with said first faces together generally lying in a common plane;
  (e) means for slideably attaching each of said seal wedges to its corresponding said ring wedge so that each of said seal wedges is slideable along said ring wedge's inclined surface;
  (f) means for restricting the motion of said seal wedges to be perpendicular to said first containment surface;
  (g) an annular elastomer seal, generally matching said ring, having its inner and outer circumference hermetically attached to said first containment surface, said elastomer seal disposed between said first faces of said seal wedges and said second containment surface, and having a central annular portion attached to said first faces of said seal wedges; and
  (h) mechanical means for rotating said ring from a first angular position to a second angular position, and maintaining said ring at said second angular position, to rotate said ring wedges to slide forth said seal wedges to extend said elastomer seal towards said second containment surface to form a fluidtight annular barrier, and for counterrotating said ring from said second angular position to said first angular position, and maintaining said ring at said first angular position, to counterrotate said ring wedges to slide back said seal wedges to retract said elastomer seal from said second containment surface to remove said fluidtight annular barrier.

2. The system of claim 1, wherein said second containment surface has an orifice, and said elastomer seal, when extended, surrounds said orifice.

3. The system of claim 2, wherein said first containment surface has an opening, and said elastomer seal surrounds said opening.

4. The system of claim 3, wherein said ring wedges are generally identical, and said seal wedges are generally identical.

5. The system of claim 4, wherein said ring wedges together are disposed in a generally contiguous array.

6. The system of claim 5, wherein said means for movably attaching said ring comprises said first containment surface having an annular groove generally matching said ring with said ring disposed in said annular groove, each of said ring wedges including a slot having the shape of an annular segment disposed coaxially with said ring and extending from said ring wedge's inclined surface through said ring terminating at said first containment surface in a narrowing ledge portion, and a fixed post disposed in each of said slots and fixed to said first containment surface with said fixed post having a shoulder portion wider than, and engaging, said ledge portion of said slot, all to hold said ring generally parallel to said first containment surface while allowing only a limited rotation of said ring about its longitudinal axis.

7. The system of claim 6, wherein said means for restricting the motion of said seal wedges comprises each of said seal wedges having a thick end, and having a bore proximate said thick end and generally perpendicular to said first containment surface, with said fixed post extended to generally match and loosely penetrate a corresponding said seal wedge bore to allow said seal wedge only to slide along said fixed post, perpendicular to said first containment surface, when said ring wedges are rotated.

8. The system of claim 7, wherein said fixed posts are generally identical and equally spaced in an annular array.

9. The system of claim 8, wherein said means for slideably attaching said seal wedges comprises each of said ring wedges having two opposing, concentric, generally similar-shaped sides with each of said sides having a channel proximate said ring wedge's inclined surface and matching its square-thread helical shape, and each of said seal wedges having two inwardly-terminating ribs with each of said ribs slideably mateable with a corresponding said channel of a corresponding said ring wedge.

10. The system of claim 9, wherein said mechanical means for rotating, counterrotating, and maintaining said ring comprises said ring having a radially outwardly extending clevis yoke, a screw slide block having a clevis pin disposed within said yoke, and a nonradially disposed lead screw drive, threadably engageable with said slide block, to translate said pin to rotate said yoke and said ring.

* * * * *